Sept. 6, 1960 G. J. VAN HECKE 2,951,468
FLUID MOTOR AND CONTROL MEANS THEREFOR
Filed Nov. 4, 1954 6 Sheets-Sheet 1
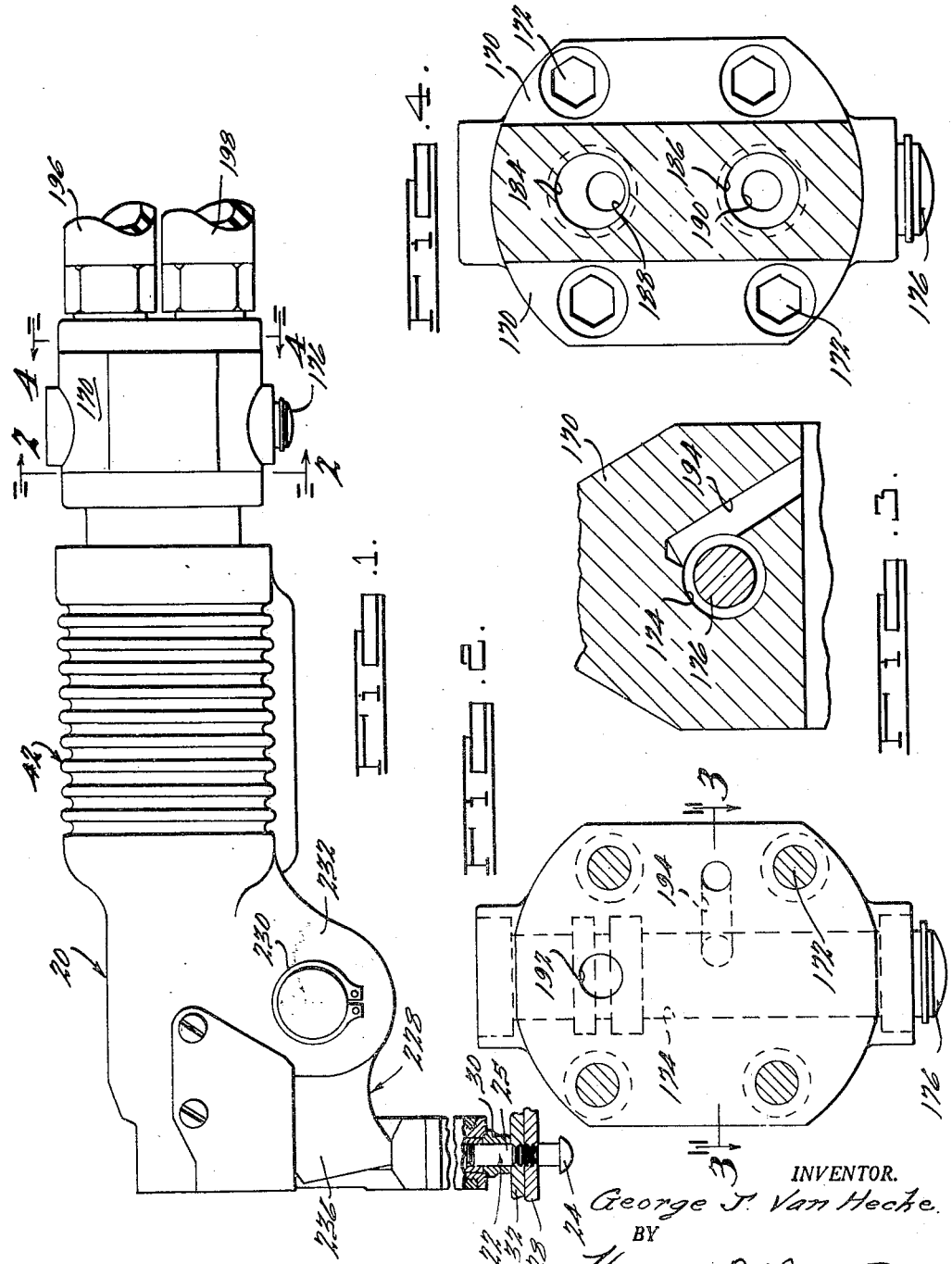
INVENTOR.
George J. Van Hecke.
BY
Harness, Dickey & Pierce.
ATTORNEYS

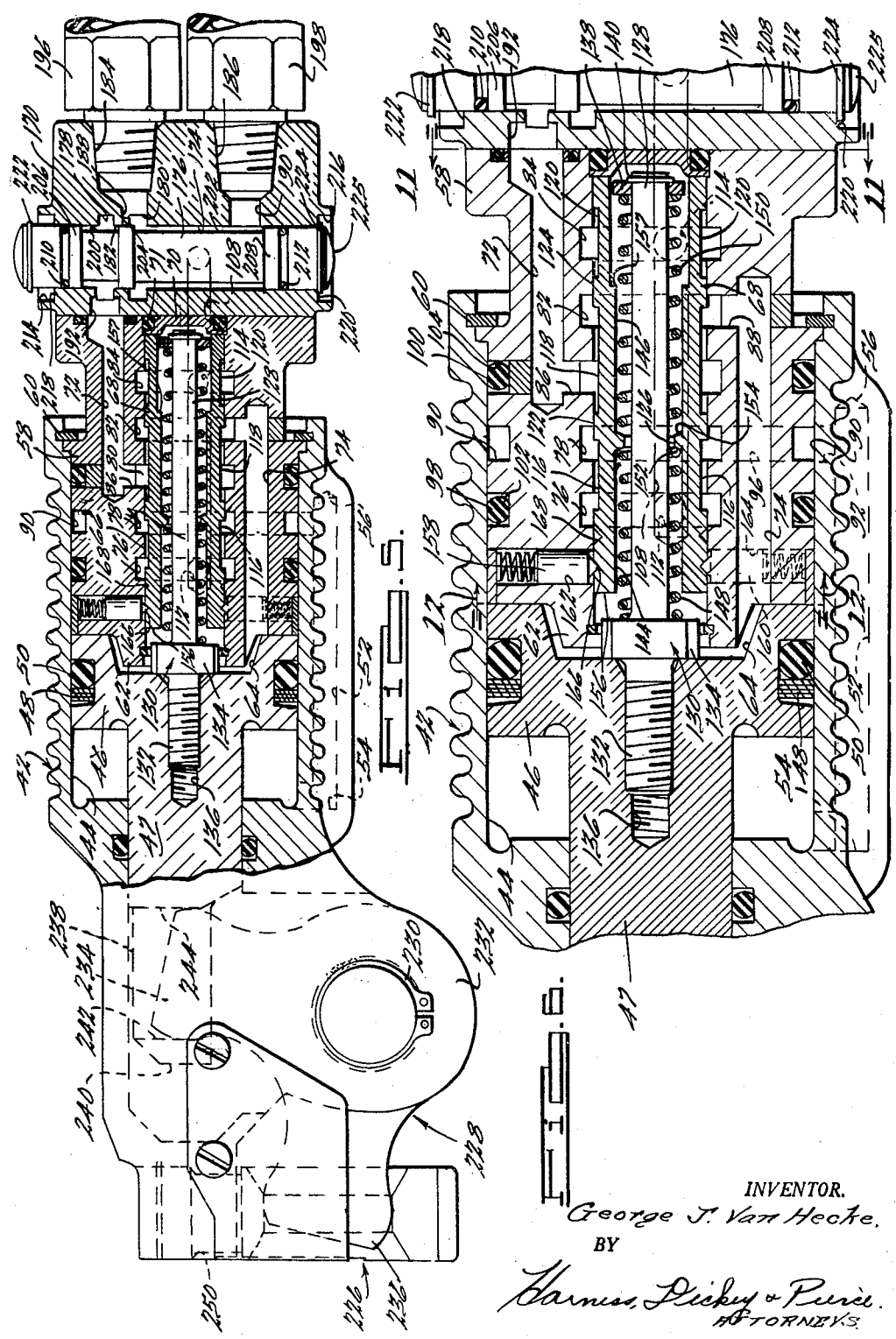

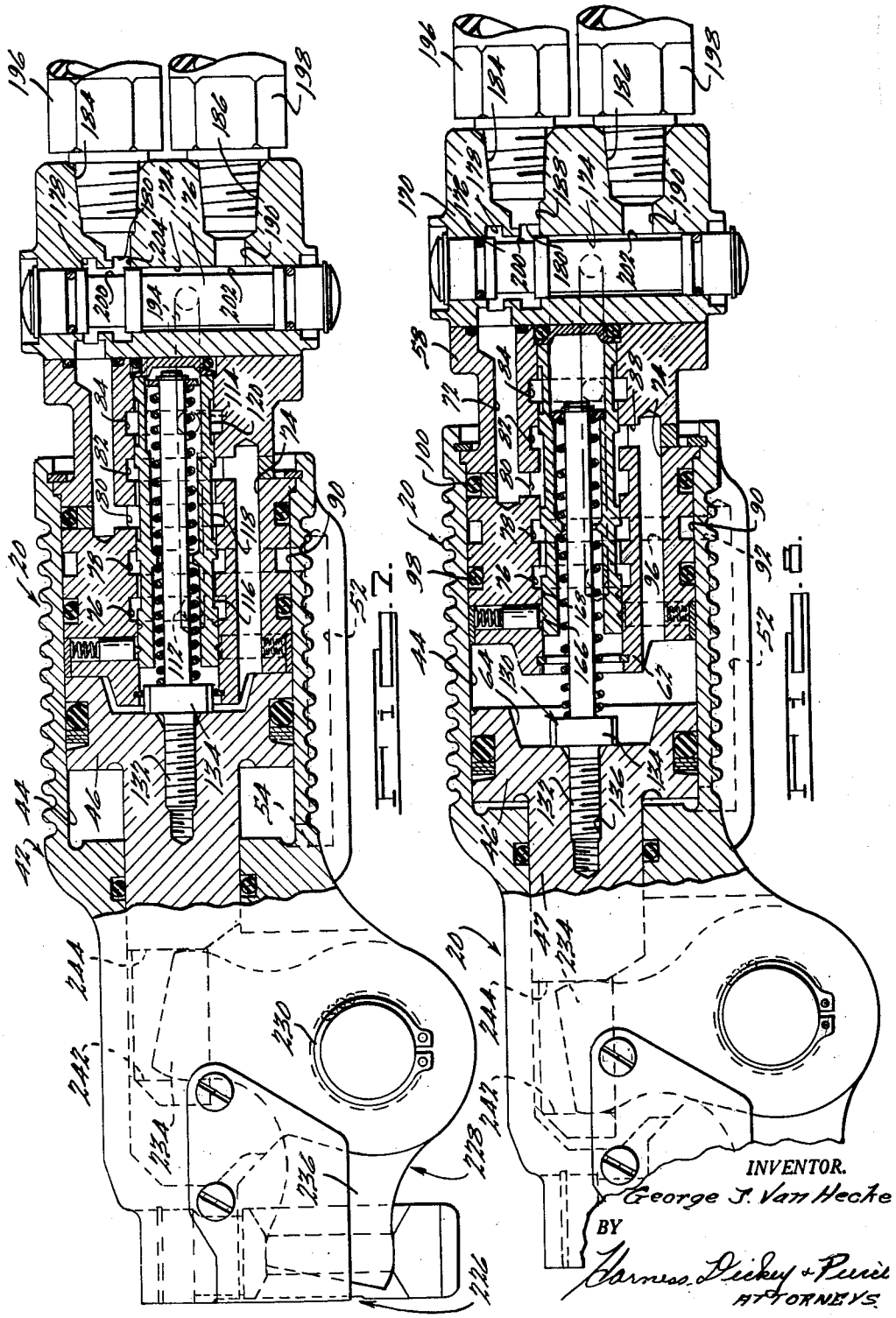

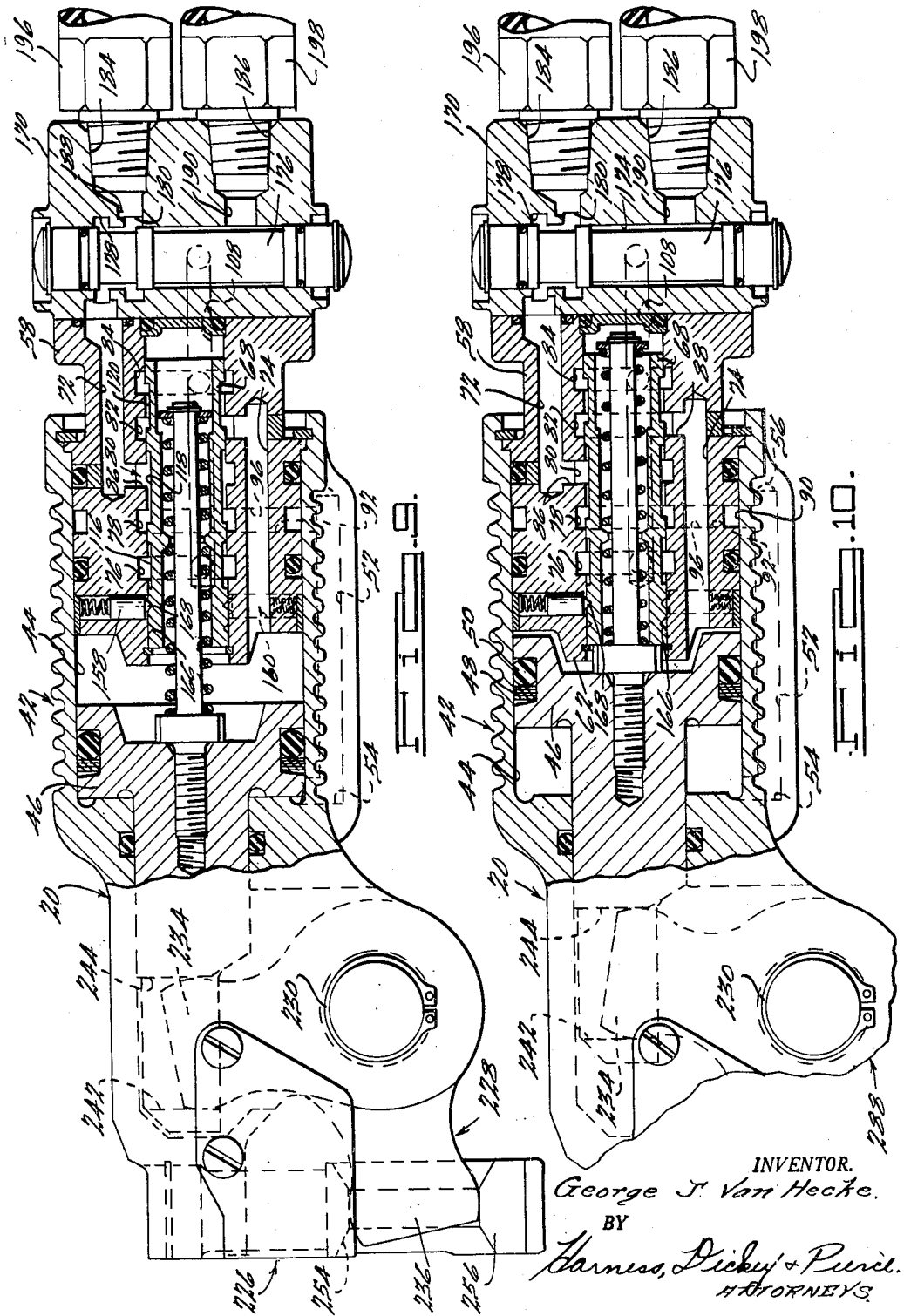

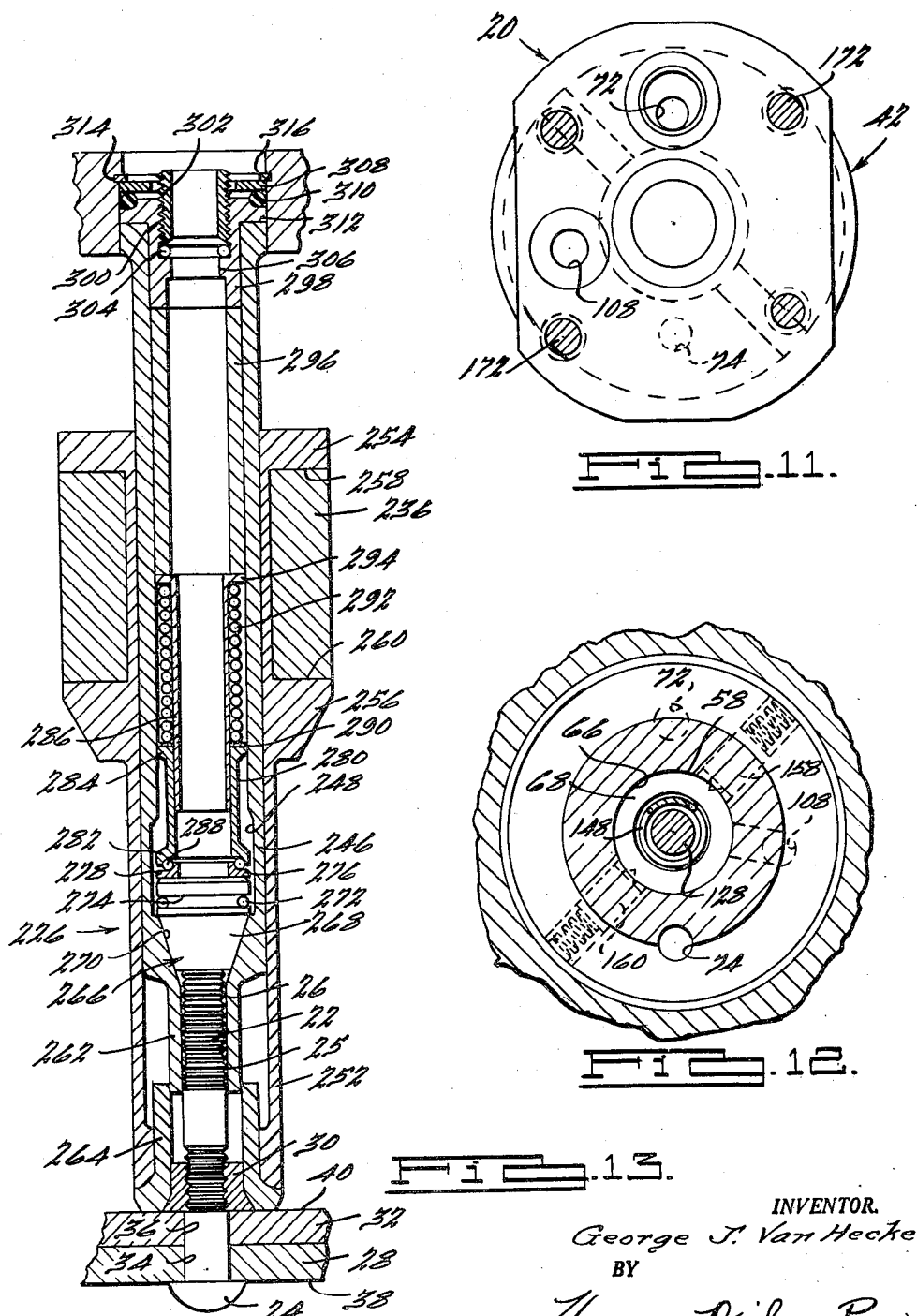

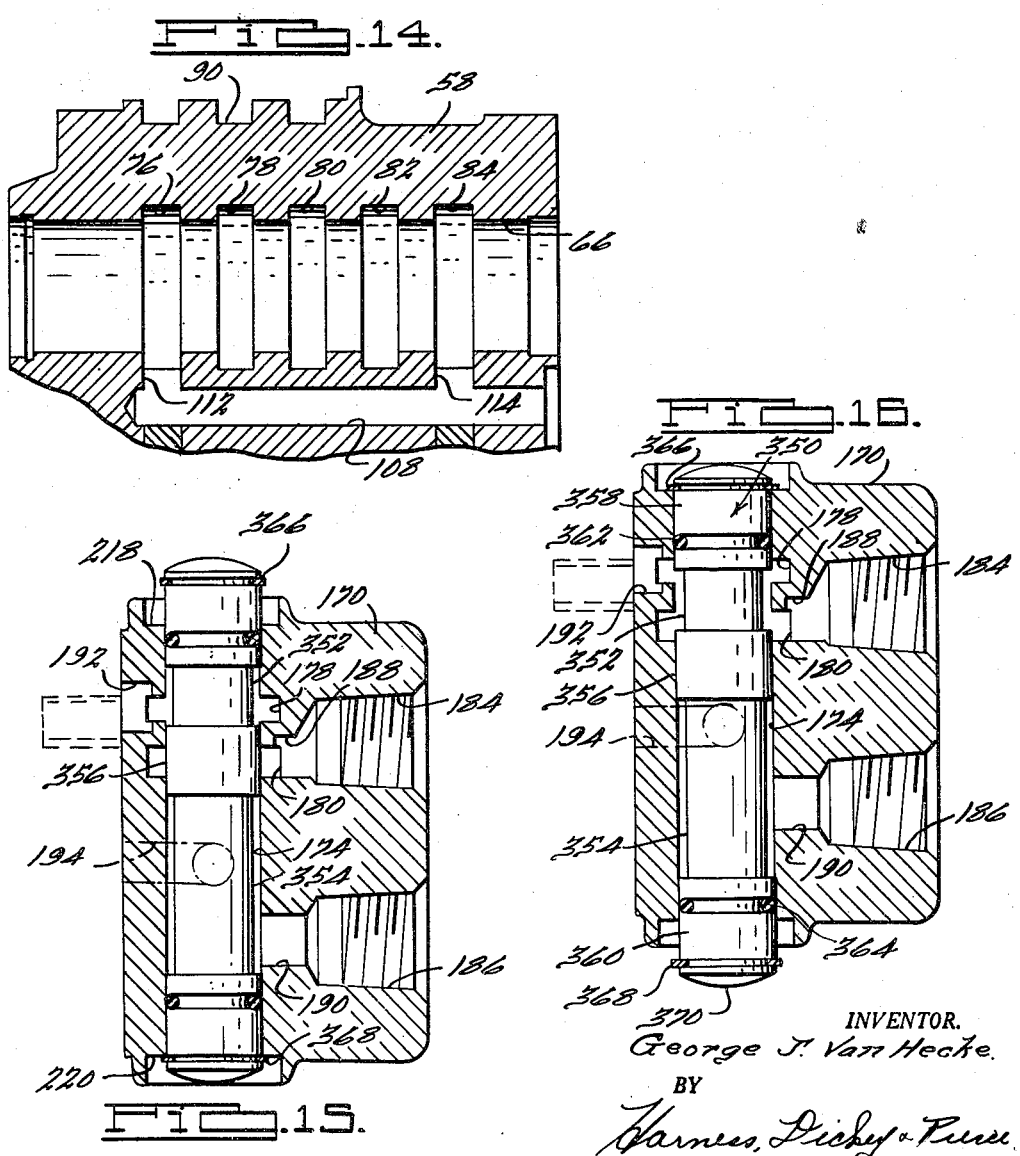

United States Patent Office 2,951,468
Patented Sept. 6, 1960

2,951,468

FLUID MOTOR AND CONTROL MEANS THEREFOR

George J. Van Hecke, Detroit, Mich., assignor to Huck Manufacturing Company, Detroit, Mich., a corporation of Michigan Filed Nov. 4, 1954, Ser. No. 466,840

6 Claims. (Cl. 121—21)

This invention relates to hydraulic driving devices and, more particularly, to an improved hydraulically actuated pull gun for driving lock bolts, blind rivets and the like.

An object of the invention is to overcome disadvantages in prior devices of the indicated character and to provide an improved hydraulically actuated pull gun incorporating improved and simplified valve means for controlling the operation thereof.

Another object of the invention is to provide an improved hydraulically actuated pull gun incorporating improved fluid circuits.

Another object of the invention is to provide an improved hydraulically actuated pull gun that is relatively simple in construction, economical to manufacture and assemble, durable, efficient and reliable in operation.

Another object of the invention is to provide an improved hydraulically actuated pull gun that is compact and relatively light in weight; which may be operated efficiently in relatively close quarters; and which reduces the labor and expense of driving lock bolts, blind rivets and the like.

Still another object of the invention is to provide an improved hydraulically actuated pull gun that may be readily adapted to drive a wide variety of fastening devices of various sizes and types.

The above as well as other objects and advantages of the present invention will become apparent from the following description, the appended claims and the accompanying drawings wherein:

Figure 1 is an elevational view, with portions in section, of a pull gun embodying the present invention and showing the same applied to a fastening device;

Fig. 2 is an enlarged transverse sectional view of the structure illustrated in Fig. 1, taken on the line 2—2 thereof;

Fig. 3 is a sectional view of a portion of the structure illustrated in Fig. 2, taken on the line 3—3 thereof;

Fig. 4 is an enlarged sectional view of the structure illustrated in Fig. 1, taken on the line 4—4 thereof;

Fig. 5 is an enlarged elevational view, with portions in section and other portions broken away, of the pull gun illustrated in Fig. 1;

Fig. 6 is an enlarged sectional view of a portion of the structure illustrated in Fig. 5;

Figs. 7-10 are longitudinal sectional views of a portion of the pull gun illustrated in Fig. 1 and showing the components thereof in successive operating positions;

Fig. 11 is a transverse sectional view of a portion of the structure illustrated in Fig. 6, taken on the line 11—11 thereof;

Fig. 12 is a transverse sectional view of a portion of the structure illustrated in Fig. 6, taken on the line 12—12 thereof;

Fig. 13 is an enlarged sectional elevational view of a portion of the structure illustrated in Fig. 1;

Fig. 14 is an enlarged sectional view of the valve housing illustrated in Fig. 5 with the distributor valve removed therefrom;

Fig. 15 is a sectional elevational view of another embodiment of the invention; and Fig. 16 is a sectional elevational view of the structure illustrated in Fig. 15, showing the same in another operative position.

Referring to the drawings, one embodiment of the invention is illustrated in Figs. 1–14, the invention being shown as incorporated in a hydraulic pull gun, generally designated 20, for driving lock bolts, blind rivets and the like, although it will be understood that the invention is applicable to other uses. A fastening device of a type that may be driven by the pull gun of the present invention is shown in Figs. 1 and 13, and includes a pin 22 having a head portion 24 and a shank portion 25, provided with longitudinally spaced pull grooves 26. The pin 22 is adapted to be inserted through a workpiece 28 from the outer side thereof and a collar 30 is fitted over the pin 22 on the outer side of a workpiece 32 and thereafter clinched to the pin 22. The workpieces 28 and 32 may comprise a pair of plate members having aligned apertures 34 and 36 therein through which the shank portion 25 of the pin 22 extends, the head portion 24 of the pin being adapted to engage the surface 38 of the plate 28 while the collar 30 is adapted to engage the surface 40 of the workpiece 32. The fastening device is set by pulling the pin 22 and applying the reaction force to the collar 30. After the desired pulling force is obtained, the collar 30 is locked to the pin 22 and upset against the adjacent workpiece 32. Subsequently, the shank portion 25 of the pin 22 is broken under tension at a weak portion adjacent the collar 30. The details of the fastening device form no part of the present invention, the fastening device and workpieces being shown merely to typify an important use of the invention.

The pull gun of the present invention includes a head piece, generally designated 42, which defines a longitudinally extending bore 44. A piston 46 having an integral rod 47 is mounted for reciprocation in the bore 44 of the head piece 42, the piston 46 being provided with suitable sealing rings, such as 48 and 50, which form a fluid tight seal between the piston and the head piece 42.

A longitudinally extending passageway 52 is formed in the head piece 42 in radially spaced relationship to the bore 44. One end of the passageway 52 is connected to the rod end of the bore 44 by a radially inwardly extending port 54 while the distal end of the passageway terminates within the head piece 42, as at 56.

A valve housing 58 is fitted in the bore 44 in the head piece 42 and secured to the head piece by a snap ring 60. The inner end portion 62 of the valve housing 58 is reduced in diameter and is adapted to fit in a recess 64 formed in the head end of the piston 46, sufficient clearance being provided between the piston 46 and the reduced portion 62 of the valve housing 58 to permit the entrance of hydraulic fluid therebetween when the peripheral portion of the piston is adjacent the peripheral portion of the inner end of the valve housing. An axially extending bore 66 is formed in the valve housing 58 and is adapted to slidably accommodate a distributor valve 68 which will be described hereinafter in greater detail. The end of the bore 66 adjacent the piston is open while the distal end of the bore 66 is closed by a closure member 70, a sealing ring 71 being provided to insure a fluid tight seal.

A longitudinally extending inlet passageway 72 is provided in the valve housing 58 in radially outwardly spaced relationship with respect to the bore 66 thereof and a longitudinally extending outlet passageway 74 is provided in the valve housing 58 diametrically opposite the inlet passageway 72 and in radially outwardly spaced relationship with respect to the bore 66, the longitudinal axes of the inlet passageway 72 and the outlet passageway 74 extending in a direction substantially parallel to the longitudinal axis of the bore 66. A plurality of longitudinally spaced annular grooves 76, 78, 80, 82 and 84 are formed in the inner wall of the valve housing 58, and the inlet passageway 72 is connected to the groove 80 by a radially outwardly extending port 86, while the outlet passageway 74 is connected to the groove 82 by a radially outwardly extending port 88.

An annular groove 90 is formed in the outer wall of the valve housing 58, the groove 90 being substantially concentric with the groove 78. The groove 90 is connected to the passageway 52 by a port 92 and is also connected to the groove 78 by a radially outwardly extending port 96, the port 96 being circumferentially spaced from the outlet passageway 74.

For the purpose of forming a fluid tight seal between the valve housing 58 and the head piece 42, sealing members 98 and 100, preferably formed of a material which is not affected by the fluid utilized in the pull gun, are fitted in grooves 102 and 104, respectively, formed in the outer wall of the valve housing on opposite sides of the groove 90.

As best seen in Fig. 12, the valve housing 58 also defines a longitudinally extending duct 108 which is disposed in radially spaced relationship with respect to the axially extending passageway 66, the end of the duct 108 remote from the piston 46 being open. The duct 108 is connected to the grooves 76 and 84 by cross ports 112 and 114, respectively.

As previously mentioned, the distributor valve 68 is mounted for reciprocation in the bore 66 of the valve housing 58. A plurality of longitudinally spaced annular grooves 116, 118 and 120 are formed in the outer wall of the distributor valve 68, the grooves 116 and 118 being separated by a land portion 122 and the grooves 118 and 120 being separated by a land portion 124. The end portions of the distributor valve and the land portions 122 and 124 are of substantially the same diameter as the bore 66 and have a sliding fit in the bore 66 with the result that a substantially fluid tight seal is formed between such peripheral portions of the distributor valve and the walls of the bore 66.

The distributor valve 68 defines an axially disposed longitudinally extending passageway 126 which is open at each end and is adapted to accommodate an actuating rod 128 that is slidably mounted in the passageway 126 and extends through the distributor valve. An actuating head 130 having a shank portion 132 and an enlarged head portion 134 is fixed to one end of the actuating rod 128 and projects longitudinally outwardly therefrom. The shank portion 132 of the actuating head 130 is threadably fitted in an internally threaded passageway 136 provided in the piston 46 so as to secure the actuating head 130 to the piston. The actuating rod 128 extends through the distributor valve 68 and the opposite end portion of the actuating rod is provided with a head 138 retained by a screw 140.

The outer end portions of the bore 126 of the distributor valve are enlarged, as at 144 and 146, and a pair of coil springs 148 and 150 are fitted around the opposite end portions of the actuating rod 128. One end portion of the coil spring 148 bears against the actuating head 130 while the opposite ends of the spring 148 bears against an internal shoulder 152 provided on the distributor valve 68. One end portion of the coil spring 150 bears against an internal shoulder 154 while the opposite end portion of the coil spring 150 bears against the head 138.

The actuating heads 130 and 138 are of greater diameter than the enlarged portions 144 and 146 of the bore 126 of the distributor valve 68 and are adapted to bear against the end 156 and a radially extending shoulder 157 provided on the distributor valve to shift the distributor valve during operation of the pull gun, as will be described hereinafter in greater detail.

For the purpose of releasably holding the distributor valve 68 in selected position, a pair of spring biased detents 158 and 160 are mounted in radially extending openings 162 and 164 provided in the valve housing 58 on opposite sides of the distributor valve 68. The detents 158 and 160 are adapted to releasably engage longitudinally spaced notches 166 and 168 provided in the distributor valve 68 to releasably hold the distributor valve in selected positions, as will be described hereinafter in greater detail.

A throttle valve housing 170 is provided which is secured to the valve housing 58, as by bolts 172. The throttle valve housing 170 defines a bore 174, the longitudinal axis of which extends transversely of the longitudinal axis of the bore 66 of the valve housing 58, and a throttle valve 176 is slidably fitted in the bore 174. A plurality of longitudinally spaced annular grooves 178 and 180 are formed in the inner wall of the throttle valve housing 170, the grooves 178 and 180 being separated by a land 182. Inlet and outlet pipe-fitting socket openings 184 and 186, respectively, are formed in the throttle valve housing 170, the inlet opening 184 being connected to the groove 180 by a port 188 and the outlet opening 186 being connected by a port 190 to the bore 174 at a position spaced from the groove 180. The groove 178 communicates with the inlet passageway 72 in the housing 58 through a port 192 and, as shown in Fig. 3, the throttle valve housing also defines a diagrammatically extending port 194, one end of which is connected to the duct 108 in the housing 58 while the distal end of the port 194 communicates with the bore 174 at a position intermediate the groove 180 and the port 190. A supply line 196 communicating with a suitable source of fluid under pressure, as for example, a power cell (not shown), is connected to the inlet opening 184 and a return line 198 is connected to the outlet opening 186, the return line serving to return the fluid to the source.

As previously mentioned, the throttle valve 176 is slidably mounted in the bore 174 of the throttle valve housing 170. A relatively narrow annular groove 200 and a relatively wide annular groove 202 are provided in the throttle valve 176, the grooves 200 and 202 being separated by a land portion 204. The end portions 206 and 208 and the land portion 204 are of substantially the same diameter as the diameter of the bore 174 and have a sliding fit in the bore 174. Suitable sealing rings 210 and 212 are also provided to insure a fluid tight seal at the opposite ends of the bore 174. The outer end portions of the bore 174 are enlarged, as at 214 and 216, to form recessed shoulders 218 and 220, and retaining rings 222 and 224 are fitted on the throttle valve at a position near the ends thereof, the distance between the rings 222 and 224 being greater than the distance between the shoulders 218 and 220 so that longitudinal movement of the throttle valve 176 in the bore 174 is permitted, the rings 222 and 224 limiting the axial movement thereof. The counterbores 214 and 216 provide protection for the throttle valve, and the ends of the throttle valve may be rounded, as at 225, to facilitate the manual application of pressure thereto.

When the throttle valve 176 is moved to the uppermost or bypass position, as viewed in Figs. 5 and 6, so that the ring 224 abuts the shoulder 220, the land portion 204 of the throttle is disposed between the grooves 178 and 180 with the result that a substantially fluid tight seal is formed between the grooves 178 and 180 while the inlet socket opening 184 communicates with the outlet socket opening 186 through the port 188, groove 180 in the throttle valve housing, the groove 202 in the throttle valve and the port 190.

When the throttle valve 176 is moved to the lowermost or actuating position, as viewed in Figs. 7 through 10, so that the ring 222 abuts the shoulder 218, the land portion 204 of the throttle valve engages the wall of the bore 174 at a position intermediate the groove 180 and the port 190 so that a substantially fluid tight seal is formed between the inlet socket opening 184 and the outlet socket opening 186, and a fluid path is provided from the inlet socket opening 184 to the groove 178 through the port 188, the groove 180 in the throttle valve housing and the groove 200 in the throttle valve.

For the purpose of actuating a collet assembly, generally designated 226, which functions to pull the pin 22 of the fastening device through the aligned apertures 34 and 36 in the workpieces 28 and 32 and also functions to upset the collar 30 on the pin 22, a rocker arm 228 is provided. The rocker arm 228 is oscillatably mounted on a bearing 230 carried by depending flange portions 232 provided on the front end portion of the head piece 42. The rocker arm 228 includes a pair of angularly spaced bifurcated arms 234 and 236. The piston rod 47 is reduced in thickness, as at 238, at a position spaced from the end 240 thereof and the arm 234 of the rocker arm 228 is positioned over the reduced portion 238 of the piston rod 47 so that the outer end portion of the arm 234 bears against the shoulders 242 and 244 defining the reduced portion 238 of the piston rod.

The collet assembly 226 is comprised of an elongate tubular collet 246 defining a longitudinally extending bore 248, and the collet 246 is mounted in a passageway 250 defined by the head piece 42. An elongate anvil holder 252 is slidably mounted on the collet 246, the anvil holder 252 having a pair of longitudinally spaced flanges 254 and 256 projecting radially outwardly therefrom. The bifurcated arm 236 of the rocker arm 228 is fitted over the anvil holder 252 between the flanges 254 and 256, the outer end surfaces of the arm 236 bearing against the surfaces 258 and 260 of the flanges 254 and 256, respectively. With such a construction, oscillation of the rocker arm 228 causes the anvil holder 252 to slide longitudinally of the collet 246. The lower end portion 262 of the collet 246, as viewed in Fig. 13, is reduced in diameter and a swaging anvil 264 is interposed between the reduced diameter portion of the collet and the anvil holder 252, the swaging anvil 264 having a sliding fit on the reduced diameter portion 262 of the collet. The bore of the swaging anvil 264 is tapered adjacent the lower end thereof and is adapted to bear against the collar 30 of a fastener to upset the collar against a workpiece when the hydraulic pull gun of the present invention is applied thereto. At a position adjacent the reduced portion 262 of the collet 246, a chuck 266 is positioned in the bore 248 of the collet, the chuck having three jaws 268 which are shaped generally in the form of a truncated cone. The bore 248 of the collet 246 is tapered at a position near but spaced from the lower end of the collet and the outer surfaces of the jaws 268 are adapted to bear against the wall 270 of the tapered portion of the bore 248 of the collet. The jaws 268 of the chuck are held in the operative relationship by a resilient retaining ring 272 which surrounds the chuck and is mounted in a groove 274 intermediate the ends of the jaws 268 of the chuck.

A tubular follower cap 276 having a radially outwardly projecting flange 278 on one thereof is fitted in the bore 248 of the collet 246, the flange portion 278 of the follower cap 276 bearing against the upper surfaces of the chuck jaws 268, as viewed in Fig. 13. An elongate follower member 280 having radially outwardly projecting flange portions 282 and 284 on the ends thereof is slidably mounted on a follower sleeve 286 fitted in the bore 248 of the collet 246. The flange portion 282 of the follower member 280 bears against a bumper 288 which is interposed between the follower member 280 and the follower cap 276 while the flange portion 284 of the follower member 280 bears against a washer 290 slidably mounted on the follower sleeve 286 and the washer 290, in turn, bears against one end of a column of O-rings 292 fitted over the follower sleeve 286. The distal end of the column of O-rings 292 bears against a radially outwardly projecting flange 294 provided on the upper end of the follower sleeve 286, as viewed in Fig. 13. One end of a tubular spacer 296 bears against the flange 294 of the follower sleeve 286 while the opposite end of the spacer 296 bears against the inner end of a screw housing 298 fitted in the bore 248 of the collet 246 at a position adjacent the upper end thereof. The screw housing 298 is provided with internal threads 300 adapted to threadably engage an externally threaded tubular adjustment screw 302, the inner end of which bears against a resilient, ring-shaped bumper 304 which is interposed between the adjustment screw 302 and a radially inwardly projecting flange 306 provided on the screw housing 298. A cushion plate 308 is fitted over the adjustment screw 302 and the peripheral portion of the cushion plate bears against a resilient cushion 310 interposed between the cushion plate 308 and a radially outwardly projecting flange 312 formed integrally with the screw housing 298, the flange 312, in turn, bearing against the upper end of the collet 246. Such a construction serves to absorb the shock imparted to a snap ring 314 which is fitted over the screw 302, the peripheral portion of the snap ring 314 being adapted to fit in a groove 316 in the head piece 42 to hold the collet assembly in the passageway 250 of the head piece 42.

This embodiment of the invention is particularly adapted for use with a power cell, whereas the embodiment of the invention illustrated in Figs. 15 and 16 is particularly adapted for use with a central power source.

In the operation of the embodiment of the invention illustrated in Figs. 1–14, the throttle valve 176 controls the actuation of the pull gun. In Figs. 5 and 6, the throttle valve 176 is shown in the "off" or bypass position, the land portion 204 being disposed intermediate the grooves 178 and 180 in the throttle valve housing 170, and the ring 224 bearing against the shoulder 220. Hydraulic fluid under pressure enters the inlet opening 184 defined by the throttle valve housing 170 from the supply line 196 which, in turn, is connected to a suitable source of hydraulic fluid under pressure, such as a power cell. The hydraulic fluid flows through the inlet opening 184, the port 188, the groove 180, the groove 202 and the port 190 to the outlet opening 186 and is returned to the source through the line 198. Such a construction permits the power cell to be operated continuously and obviates the necessity of stopping the power cell each time the pull gun is stopped.

Assuming that it is desired to impart reciprocatory motion to the piston, the throttle valve 176 is pressed downwardly, as viewed in Figs. 7–10, so that the ring 222 engages the shoulder 218 and the land portion 204 of the throttle valve is disposed intermediate the groove 180 and the port 190, as shown in Fig. 7. When the components of the hydraulic gun are positioned in the manner illustrated in Fig. 7, the throttle valve 176 directs the hydraulic fluid from the inlet opening 184 through the port 188, the groove 180, the groove 200, and the groove 178, through the port 192 to the longitudinally extending passageway 72. The fluid flows from the passageway 72 through the port 86, the groove 80, the groove 118, the groove 82, through the port 88 and the passageway 74 to the head end of the piston 46, thereby driving the piston toward the rocker arm 228. The hydraulic fluid in the rod end of the bore 44 is exhausted to the reservoir through the port 54 and the passageway 52, the port 92, the groove 90, the port 96, the annular grooves 78, 116 and 76, and the port 112 to the duct 108. The fluid flows through the duct 108, the port 194, the groove 202 and the port 190 to the outlet opening 186 and the return line 198. As shown in Fig. 8, the piston 46 then moves to the forward end of the bore 44 in the head piece 42. As the piston 46 moves forwardly, the distributor valve 68 is held in place by the spring loaded detent pins 158 and 160 which engage the notches 166 in the distributor valve.

As previously mentioned, the actuating rod 128 is fixed to the piston by the head 130 and the actuating rod 128 moves forwardly as the piston 46 moves forwardly. As the forward motion continues, the distributor valve rear shift spring 150 is compressed by the head 138, thereby increasing the load on the spring 150 while the distributor valve front shift spring 148 is opened, thereby decreasing the load on the spring 148. As the piston 46 approaches the end of its stroke, the actuating rod head 138 engages the radially extending shoulder 157 on the distributor valve 68 and moves the distributor valve so that the detent pins 158 and 160 are disengaged from the notches 166. When the detent pins 158 and 160 are free of the notches 166, the energized rear shift spring 150 shifts the distributor valve 68 to a position where the detent pins 158 and 160 snap into the notches 168 on the distributor valve 66, as shown in Fig. 9.

As the piston 46 moves toward the rocker arm, the shoulders 244 of the piston rod 47 bear against the arm 234 of the rocker arm 228 to rotate the rocker arm 228 in a counterclockwise direction about the longitudinal axis of the bearing 230, as viewed in Figs. 7 and 8. The arm 236 of the rocker arm 228 then bears against the flanges 256 of the anvil holder 252 and forces the anvil holder 252 to move longitudinally downwardly relative to the collet 246 so that the swaging anvil 264 bears against the collar 30 and moves the collar longitudinally relative to the shank 25 of the pin 22. At the same time, the tapered surfaces 270 of the collet 246 bear against the tapered surfaces of the chuck jaws 268 to hold the chuck jaws 268 in the closed position with the result that the chuck jaws grip the shank 25 of the pin 22 and pull the pin 22 through the apertures 34 and 36 of the plates 28 and 32.

In Fig. 9 the piston 46 is shown at the forward end of its stroke. In this position, the distributor valve 68 has been shifted forwardly by the rear shift spring 150 so that the spring biased detents 158 and 160 engage the notches 168 in the distributor valve 68. In this position, the distributor valve 68 distributes hydraulic fluid from the passageway 72 through the port 86, the groove 80, the groove 118 and the groove 78, through the cross port 96, the groove 90, the port 92, the passageway 52, and the port 54 to the rod end of the bore 44 to drive the piston 46 rearwardly. As the hydraulic fluid enters the rod end of the bore 44, the piston 46 starts its return stroke. As the piston 46 moves longitudinally of the bore 44 toward the distributor valve 68, the front shift spring 148 is compressed by the actuating rod head portion 134, thereby increasing the load on the spring 148 while the rear shift spring 150 is opened and the load thereon is decreased. As the piston 46 continues its rearward motion, the oil in the head end of the bore 44 is forced back to the reservoir through the longitudinally extending passageway 74, the cross port 88, the annular groove 82, the groove 120, the groove 84 and the port 114 to the duct 108, the fluid flowing from the outlet duct 108 through the port 194 to the outlet line 198 and the fluid reservoir, as previously described.

With the throttle valve 176 maintained in the actuating position and the distributor valve 68 in the forward position, as shown in Fig. 9, the hydraulic fluid is directed from the passageway 72 through the port 86, the groove 80, the groove 118, and the groove 78, through the cross port 96, the groove 90, the port 92, the passageway 52 and the port 54 to the rod end of the bore 44, thus forcing the piston 46 longitudinally of the bore 44 toward the position shown in Fig. 10. As the return stroke of the piston continues, the front shift spring 148 is compressed and the load thereon is increased. As the piston continues to move, the actuating rod head portion 134 engages the adjacent end 156 of the distributor valve 68 and pushes the distributor valve so that the spring loaded detent pins 158 and 160 are disengaged from the notches 168. The shift spring 148 then shifts the distributor valve 68 longitudinally of the bore 66 of the valve housing 58 so that the detent springs 158 and 160 engage the notches 166 in the distributor valve 68.

As the piston 46 moves toward the distributor valve 68, the shoulders 242 of the piston rod 47 bear against the arm 234 of the rocker arm 228 to rotate the rocker arm 228 in a clockwise direction about the longitudinal axis of the bearing 230, as viewed in Figs. 9 and 10. As the rocker arm 228 rotates, the arm 236 bears against the flanges 254 of the anvil holder 252 to move the anvil holder 252 upwardly relative to the collet 246. At the same time, the chuck jaws 268, follower cap 276 and the chuck jaw follower 280 move upwardly relative to the follower sleeve 286 so that the flange 284 of the chuck follower 280 bears against the washer 290 and the washer 290, in turn, compresses the column of O-rings 292. The chuck jaws 268 also move upwardly relative to the collet 246 with the result that the tapered surfaces of the chuck jaws 268 slide upwardly on the surfaces 270 of the collet, thus permitting the chuck jaws 268 to open slightly so that the chuck jaws may move longitudinally downwardly with respect to the shank 25 of the pin 22 toward the plates 28 and 32. When the piston 46 reverses its direction of travel, the chuck jaws 268 grip the shank 25 of the pin 22 at a position nearer the plate 32 and pull the pin 22 through the apertures 34 and 36, as previously described. When the piston 46 completes its rearward stroke, a full cycle is completed and the piston 46 is then positioned in the bore 44 of the head piece 42, as shown in Fig. 7, and ready to start its forward stroke. As the piston reciprocates, the chuck jaws 268 successively grip the shank 25 of the pin 22 at longitudinally spaced positions and pull the pin 22 through the apertures 34 and 36 in the plates 28 and 32. At the same time, the swaging anvil 264 engages the collar 30 of the rivet to force the collar 30 against the surface 40 of the adjacent plate 32. When the desired pulling force is obtained, the collar 30 is upset against the plate 32 and the shank 25 of the pin 22 is broken under tension at a weak portion adjacent the collar 30. The broken portion of the pin 22 then moves through the chuck jaws 268, the follower cap 276, the follower sleeve 286 and the tubular spacer 296 and is discharged through the bore of the tubular adjustment screw 302.

Another embodiment of the invention particularly adapted for use with a central power supply is illustrated in Figs. 15 and 16. This embodiment of the invention includes the throttle valve housing 170 which is secured to the valve housing 58 in the manner previously described. In this embodiment of the invention a throttle valve 350 is slidably fitted in the bore 174 of the throttle valve housing. A relatively narrow annular groove 352 and a relatively wide annular groove 354 are provided in the throttle valve 350, the grooves 352 and 354 being separated by a relatively wide land portion 356. The end portions 358 and 360 and the land portion 356 are of substantially the same diameter as the diameter of the bore 174 and have a sliding fit in the bore 174. Suitable sealing rings 362 and 364 are also provided to insure a fluid tight seal at the opposite ends of the bore 174, and retaining rings 366 and 368 are fitted on the throttle valve 350 at a position near the ends thereof, the distance between the rings 366 and 368 being greater than the distance between the shoulders 218 and 220 on the throttle valve housing so that longitudinal movement of the throttle valve 350 in the bore 174 is permitted. The ring 366 is adapted to engage the shoulder 218 and the ring 368 is adapted to engage the shoulder 220 to limit the axial movement of the throttle valve 350. In order to facilitate the manual application of pressure to the throttle valve, the opposite ends thereof may be rounded, as at 370.

When the throttle valve 350 is moved to the uppermost or "off" position, as shown in Fig. 15, so that the ring 368 abuts the shoulder 220, the land portion 356 of the throttle valve is positioned to close the groove 180 and simultaneously engage the walls of the bore 174 on opposite sides of the groove 180 whereby a substantially fluid tight seal is provided between the grooves 178 and 180 and a substantially fluid tight seal is also provided between the groove 180 and the port 190. With such a construction, when the throttle valve is in the "off" position, the fluid is prevented from bypassing through the bore 174 to the outlet line, thereby conserving the high pressure fluid.

When the throttle valve 350 is moved to the lowermost or actuating position, as viewed in Fig. 16, so that the ring 366 abuts the shoulder 218, the land portion 356 of the throttle valve engages the wall of the bore 174 at a position intermediate the groove 180 and the port 190 with the result that a substantially fluid tight seal is formed in the bore 174 between the inlet socket opening 184 and the outlet socket opening 186 while a fluid path is provided from the inlet opening 184 to the groove 178 through the port 188, the groove 180 and the groove 352. The fluid then flows to the passageway 72 through the port 192 to actuate the pull gun in the manner previously described and the fluid is returned to the source through the port 194, the groove 354 and the port 190.

While preferred embodiments of the invention have been shown and described, it will be understood that various changes and modifications may be made without departing from the spirit of the invention.

What is claimed is:

1. A fluid motor comprising, in combination, a body defining a bore, a piston mounted for reciprocation in said bore, a first valve housing fixed to said body and defining a fluid inlet passageway and a single outlet duct, means including a first valve carried by said first housing for successively establishing fluid paths from said inlet passageway to said bore on opposite ends of said piston to drive said piston successively in opposite directions, a second valve housing defining a bore having an inlet port and an outlet port, a second valve slidably mounted in the bore of said second housing and having end portions selectively engageable on opposite sides of said second housing, said second valve being operable to establish a fluid path from said inlet port to said inlet passageway and a fluid path from said single outlet duct to said outlet port.

2. A fluid motor comprising, in combination, a body defining a bore, a piston reciprocally mounted in one end portion of said bore, a first valve housing fixed to said body in the opposite end portion of said bore and defining a fluid inlet passageway and a single fluid outlet duct, fluid circuit means connecting said passageway and said duct with said bore, a first valve carried by said first housing and operable to permit fluid to flow successively from said inlet passageway to said bore on opposite ends of said piston to drive said piston in opposite directions and to permit fluid to flow successively from said bore on opposite ends of said piston to said single outlet duct, a second valve housing carried by said body and defining a bore extending transversely of the bore in said body, said second housing also defining an inlet port and an outlet port communicating with the bore thereof, a second valve carried by said second housing and having end portions selectively engageable on opposite sides of said second housing, said second valve being operable to establish a fluid path from said inlet port to said inlet passageway and a fluid path from said single outlet duct to said outlet port.

3. A fluid motor comprising, in combination, a body defining a bore, a piston mounted for reciprocation in said bore, a first valve housing fixed to said body and defining a fluid inlet passageway and a single outlet duct, means including a first valve actuable to successively establish fluid paths from said inlet passageway to said bore on opposite ends of said piston to drive said piston successively in opposite directions and to permit fluid to flow successively from said bore on opposite ends of said piston to said single outlet duct, spring means actuable in response to the movement of said piston to shift said first valve between selected positions, a second valve housing carried by said body and having inlet and outlet ports, means including a second valve having end portions selectively engageable on diametrically opposite sides of said second valve housing and actuable to establish a fluid path between said inlet port and said inlet passageway, said second valve also being actuable to establish a fluid path permitting fluid to flow directly from said inlet port to said outlet port and simultaneously forming a fluid-tight seal between said inlet port and said inlet passageway.

4. A fluid motor comprising, in combination, a body defining a bore, a piston mounted for reciprocation in said bore, a first housing fixed to said body and defining a fluid inlet passageway and a single outlet duct, means including a first valve coaxially aligned with said piston and responsive to the movement of said piston to provide communication between said inlet passageway and said bore at opposite ends of said piston during operative cycles of said piston and to provide communication between said single outlet duct and said bore at opposite ends of said piston, means for releasably holding said first valve in selected positions, a second housing defining a second bore having an inlet port and an outlet port, a second valve mounted for reciprocation in the bore of said second housing and having end portions selectively engageable on opposite sides of said second housing, the longitudinal axis of said second valve intersecting the longitudinal axis of the bore defined by said body at substantially right angles and being substantially coplanar therewith, said second valve being operable to establish a fluid path from said inlet port to said inlet passageway through a portion of the bore of said second housing and to establish a fluid path from said single outlet duct to said outlet port through another portion of the bore of said second housing.

5. A fluid motor comprising, in combination, a body defining a bore, a piston mounted for reciprocation in the bore defined by said body, a first valve housing fixed to said body, said first valve housing having a centrally disposed passageway therethrough coaxially aligned with the bore defined by said body, said first valve housing also having a fluid inlet passageway and a single fluid outlet duct radially outwardly spaced from said centrally disposed passageway, said centrally disposed passageway having a plurality of longitudinally spaced annular grooves in the wall thereof, means including a distributor valve mounted in said centrally disposed passageway and having a plurality of longitudinally spaced annular grooves therein registerable selectively with grooves in the walls of said centrally disposed passageway to successively establish fluid paths from said inlet passageway to said bore on opposite ends of said piston to drive said piston in opposite directions and to successively establish fluid paths from said bore on opposite ends of said piston to said single outlet duct, a second housing carried by said first housing, said second housing defining a bore extending transversely of the bore in said body and having a plurality of longitudinally spaced annular grooves therein, the longitudinal axis of the bore defined by said second housing intersecting the longitudinal axis of the bore defined by said body at substantially right angles and being substantially coplanar therewith, said second housing also having inlet and outlet ports communicating with the bore thereof, and control means including a second valve mounted in the bore of said second housing and having an annular groove therein registerable with selected grooves in the bore of said second housing, said second valve having end portions selectively engageable on opposite sides of said second valve housing, said second valve being actuable to establish a fluid path from said inlet port to said inlet passageway and to establish a fluid path from said single outlet duct to said outlet port.

6. A fluid motor comprising, in combination, a body defining a bore, a piston mounted for reciprocation in the bore defined by said body, a first valve housing fixed to said body, said first valve housing having a centrally disposed longitudinally extending passageway therethrough coaxially aligned with the bore defined by said body, said first valve also having a fluid inlet passageway and a single outlet duct radially outwardly spaced from said centrally disposed passageway, said centrally disposed passageway being defined by a wall having a plurality of longitudinally spaced annular grooves therein, means including a distributor valve mounted for reciprocation in said centrally disposed passageway and having a plurality of longitudinally spaced annular grooves therein registerable selectively with the grooves in the wall defining said centrally disposed passageway to successively establish fluid paths from said inlet passageway to the bore defined by said body on opposite ends of said piston to drive said piston successively in opposite directions and to successively establish fluid paths to said single outlet duct from said bore on opposite ends of said piston, a second valve housing fixed to said first housing, said second housing defining a bore extending transversely of the bore in said body, said second housing also having a plurality of ports interconnecting the bore thereof with said inlet passageway and said single outlet duct, the bore in said second housing also having a plurality of spaced annular grooves and inlet and outlet ports directly connected to said inlet passageway and said single outlet duct defined by said first valve housing, control means including a second valve mounted in the bore of said second housing and having an annular groove therein registerable with selected grooves in the wall of the bore of said second housing, said second valve having end portions selectively engageable on opposite sides of said second housing and being actuable to establish fluid paths permitting fluid to flow from said inlet port to said inlet passageway and also permitting fluid to flow from said single outlet duct to said outlet port.

References Cited in the file of this patent

UNITED STATES PATENTS

| | | |
|---|---|---|
| 1,931,452 | Wheeler | Oct. 17, 1933 |
| 2,355,520 | Fischer | Aug. 8, 1944 |
| 2,404,747 | Sacchini | July 23, 1946 |
| 2,443,568 | Palm | June 15, 1948 |
| 2,450,564 | Sacchini | Oct. 5, 1948 |
| 2,597,443 | Broughton | May 20, 1952 |
| 2,632,424 | Solmer | Mar. 24, 1953 |
| 2,784,700 | Griffith | Mar. 12, 1957 |
| 2,789,539 | Griffith et al. | Apr. 23, 1957 |